(12) United States Patent
Ogawa

(10) Patent No.: US 8,407,477 B2
(45) Date of Patent: Mar. 26, 2013

(54) INFORMATION DISTRIBUTION SYSTEM AND PROGRAM FOR THE SAME

(76) Inventor: Keiko Ogawa, Arakawa-ku (JP)

( * ) Notice: Subject to any disclaimer, the term of this patent is extended or adjusted under 35 U.S.C. 154(b) by 287 days.

(21) Appl. No.: 12/810,658

(22) PCT Filed: Dec. 25, 2008

(86) PCT No.: PCT/JP2008/073556
§ 371 (c)(1),
(2), (4) Date: Jun. 25, 2010

(87) PCT Pub. No.: WO2009/084573
PCT Pub. Date: Jul. 9, 2009

(65) Prior Publication Data
US 2010/0281265 A1 Nov. 4, 2010

(30) Foreign Application Priority Data
Dec. 27, 2007 (JP) ................................. 2007-337732

(51) Int. Cl.
*H04L 9/00* (2006.01)
(52) U.S. Cl. .......................................... 713/176; 726/27
(58) Field of Classification Search .................... 713/176
See application file for complete search history.

(56) References Cited

U.S. PATENT DOCUMENTS

| | | | |
|---|---|---|---|
| 6,219,669 B1 | 4/2001 | Haff et al. | |
| 2006/0026042 A1* | 2/2006 | Awaraji et al. | 705/3 |
| 2006/0271482 A1* | 11/2006 | Bito et al. | 705/50 |
| 2007/0124310 A1* | 5/2007 | Mathur | 707/10 |
| 2007/0143600 A1* | 6/2007 | Kellil et al. | 713/163 |
| 2008/0013718 A1* | 1/2008 | Okamoto | 380/30 |
| 2010/0046757 A1* | 2/2010 | Dancer et al. | 380/277 |

FOREIGN PATENT DOCUMENTS
JP 2002 305513 10/2002

OTHER PUBLICATIONS

Seki, K. et al., "A Proposal of A new Distribution Scheme For Software Products", Information Processing Society of Japan Kenkyu Hokoku, Joho System 45-3, vol. 93, No. 68, pp. 19-28 (Aug. 18, 1993) (with English translation).
Takebe, Y. et al., "A Next-Generation P2P Contents Sharing System—Implementing Content Consistency Maintenance and Full-Text Search-", Congnitive Research Lab. http://www..crl.co.jp/ School of Enginering Univerisity of Tokyo, vol. 2003, No. 19, pp. 73-78 (Dec. 10, 2003) (with English translation).
Canadian Office Action dated Jul. 27, 2011, in Canadian Patent Application No. 2,714,196.

* cited by examiner

*Primary Examiner* — Matthew Smithers
(74) *Attorney, Agent, or Firm* — Oblon, Spivak, McClelland, Maier & Neustadt, L.L.P.

(57) ABSTRACT

The present invention is made to provide an information distribution system capable of securely storing digitized personal information in an encrypted state in a storage section and securely transferring/disclosing the stored digitized information only to a particular third person via a network. Communication of the information is securely performed in the encrypted state between information terminals connected to the communication network (between a client and a server or between peer-to-peer client terminals). An information terminal which has created information encrypts the original information by a common key generated upon communication and stores the information in a secure storage of one of the information terminals connected to the communication network while maintaining the encrypted state. Further, the system creates a mechanism for authenticating a person having a particular authority for viewing the encrypted information and index information having an encrypted common key and link information indicating the location of the information for supply to a user.

9 Claims, 9 Drawing Sheets

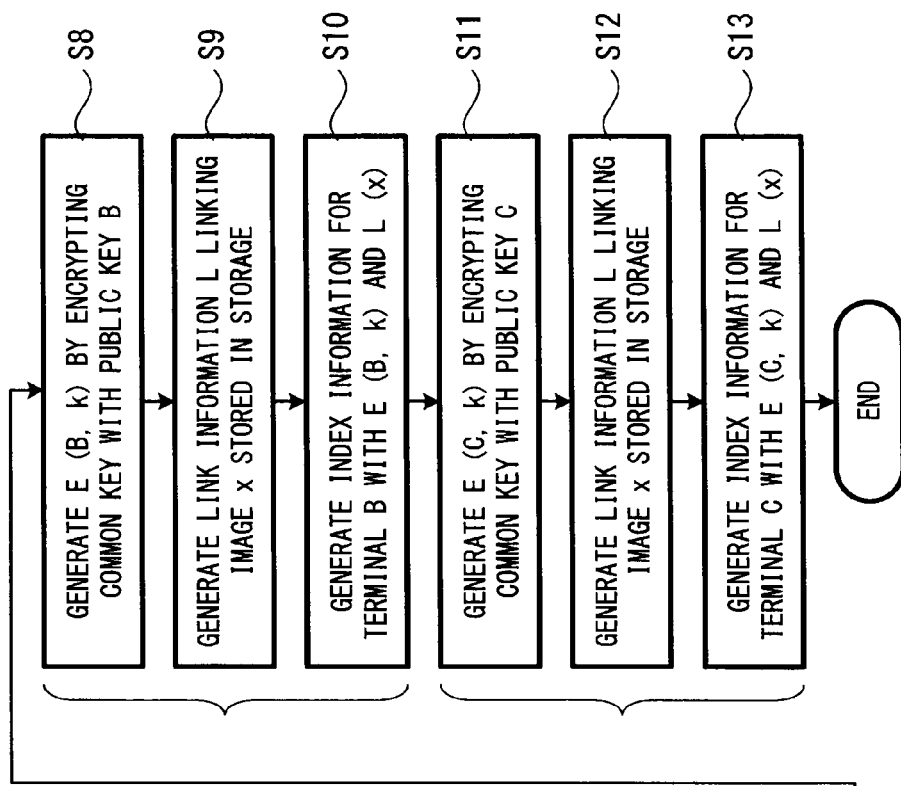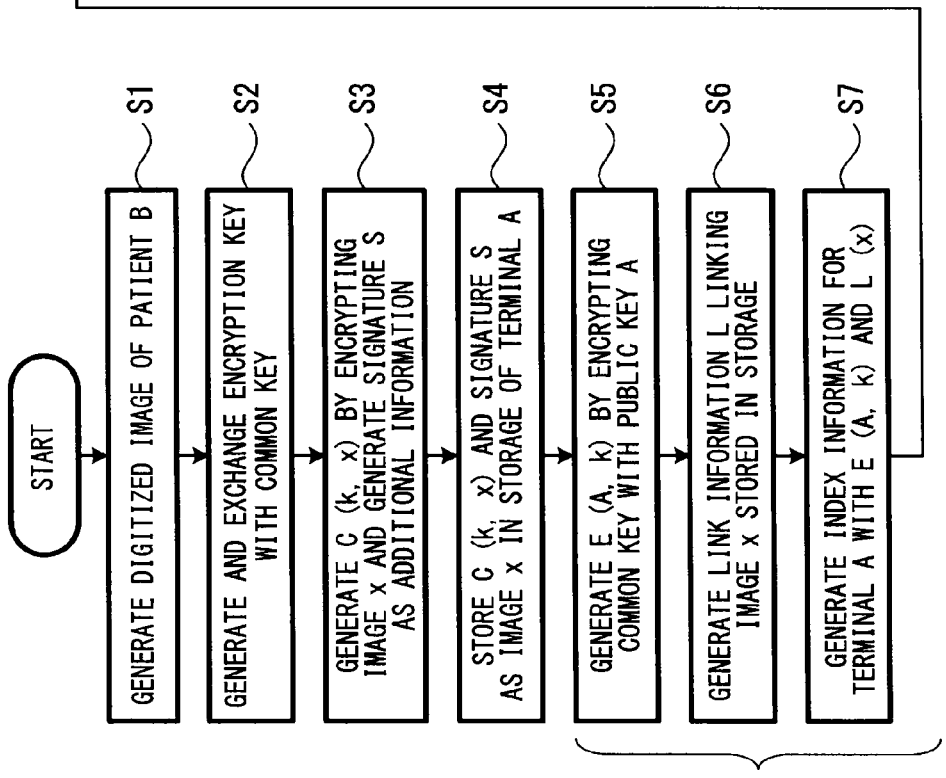
FIG. 4

INFORMATION DISTRIBUTION SYSTEM AND PROGRAM FOR THE SAME

TECHNICAL FIELD

The present invention relates to an information distribution system and a program for realizing the information distribution system. More particularly, the present invention relates to an information distribution system excellent in security and information distribution performance between a server and a client or between a plurality of client information terminals, such as peer-to-peer terminals, via the Internet network, and a program for realizing the information distribution system.

BACKGROUND ART

In recent years, networks such as the Internet have become indispensable infrastructure of society, and systems for sophisticatedly using information are built on the networks. On the other hand, just like other properties, information can be considered as assets owned by individuals or corporations. If important information is leaked over a network through which the information diffuses instantly, irrevocable loss will be caused. Innumerable information leakage problems in such a manner actually occur in reality.

However, if strictly keeping information secret in order to prevent leakage, it will cause inconvenience in information exchange and information utilization between kind collaborators, such as sharing medical information between medical experts for cooperation purpose.

In order to securely deliver information and yet sophisticatedly use information, it is necessary to develop an information distribution system enabling both the "security of information" and the "freedom of information exchange".

Such a system, which can securely hold information and securely transfer the information to a required place, is configured by a secure storage system and a secure transport system.

However, under the current circumstances, although an encrypted storage system and an encrypted transport system are individually arranged and security thereof is each guaranteed, it is undeniable that there is a dangerous area between the storage system and the transport system. In other words, there exist cases such as where data taken from the encrypted file is transmitted after being decrypted, where data received by encryption communication is then stored in plaintext, and the like. All these are elements which may lead to information leakage.

Further, access authentication for accessing the storage (file) system and opposite party authentication for performing communication are typically separately managed. Further, management of these authentications is performed by an expert on the center side, and the client (the user) who actually owns the information can not designate a person to access the information on his (or her) terminal side and on his (or her) own will.

As described above, there are two problems. The first problem lies in security of information transmission. With the conventional method in which the information is encrypted and transmitted, and then the encrypted information is decrypted at the destination to obtain the original information, it is impossible to completely guarantee security. The second problem lies in freedom of information transmission. For the sake of "security", management of access to the information is performed by an administrator on the server side, and therefore the actual owner of the information can not freely handle the information and freely disclose the information to a trusted third person.

As an encryption technology to solve the first problem, there is a storage technology which has an encryption storage function. The encryption storage function is responsible for transmitting electronic data (such as image, character and the like) in an encrypted state, and storing the data in a storage section in the encrypted state.

Herein, an encryption key for performing encryption is managed by the user who sends the information. Thus, the encryption key of the user who sends the information has to be used to decrypt the encrypted data. Thus, only the owner of the encryption key (i.e., the user who sends the information) can encrypt his (or her) electronic data, and decrypt the encrypted data.

However, since the user who sends the information obviously will never give his (or her) encryption key to any other person, the difficult problem is still outstanding when the user wants to securely distribute the encrypted electronic data to a particular user other than himself (or herself).

As to the second problem, for example, when performing communication between a head office and a branch office via the Internet, high security has to be guaranteed. To serve this purpose, a technique is proposed in which a private key is provided to the server on the head office side, and a public key corresponding to the private key of the head office is provided to each client on the branch office side (see Patent Document 1).

According to the technique disclosed in Patent Document 1, a common key is generated on the branch office side (i.e., the client side). Further, the generated common key is encrypted using the public key and transmitted to the server side (i.e., the head office side). The server can obtain the common key generated on the client side by decrypting the received information with its own private key.

[Patent Document 1] Japanese Unexamined Patent Application Publication No. 2002-305513

DISCLOSURE OF THE INVENTION

Problems to be Solved by the Invention

The art disclosed in Patent Document 1 is a system for performing information encryption and decryption by both the server of the head office and the client of the branch office. Although security of communication is guaranteed, there is a danger that the data is decrypted on the server side so that the data can be referenced by anyone. If the data is not once decrypted, the data can not be transferred from the server to the other client. Further, the client who owns the information can not designate a client to use the information (i.e., a client to whom the owner want to transfer the information). In other words, the system is provided with no mechanism for storing personal information in an encrypted state and providing the stored information to the server and the other clients in the encrypted state. The information can not be distributed if the administrator on the server side is not interposed.

As described above, it is a reality that, in the current technology, when personal information is created as electronic data, there is no technique established for allowing the owner of the personal information to securely store his (or her) electronic data in a storage section by himself (or herself), and securely disclose the stored electronic data to a trusted third person by himself (or herself) via a network.

In view of the aforesaid problems, it is an object of the present invention to provide an information distribution system enabling a user to securely store his (or her) personal information, which is created as electronic data, in a storage section in an encrypted state, and securely transmit the stored electronic data to a particular trusted third person via a network, and a program for the information distribution system.

Means for Solving the Problems

To achieve the aforesaid object, an information distribution system according to an aspect of the present invention is adapted to distribute information between a plurality of information terminals connected to a communication network.

First, at least one information terminal of the plurality of information terminals comprises: a section adapted to store a public key and a private key necessary to encrypt the common key; a common key generating section adapted to generate a common key for performing encryption communication between itself and another information terminal via the communication network; an original information encrypting section adapted to encrypt original information owned by any one of the plurality of information terminals based on the common key; a common key encrypting section adapted to encrypt the common key with the public key.

Further, the one information terminal comprises: a common key extracting section adapted to extract the encrypted common key with the private key; a decryption processing section adapted to decrypt encrypted information of encrypted original information encrypted by the one information terminal based on the extracted common key; an encrypted signature generating section adapted to generate an encrypted signature using the private key.

On the other hand, at least one information terminal of the other information terminals of the plurality of information terminals has: a secure storage including an original information storing section adapted to store the encrypted original information encrypted by the one information terminal in the encrypted state, and a secure transport core having a program for performing encryption communication of the information transmitted/received via the communication network installed therein.

Further, the at least one information terminal of the plurality of information terminals connected to the communication network comprises: an authorized terminal authenticating section adapted to authenticate an authorized information terminal of the plurality of information terminals that is authorized to view the encrypted original information by the information terminal that owns the encrypted original information; a link information generating section adapted to generate link information for linking encrypted information of the common key to the encrypted information of the original information; an index information generating section adapted to generate index information for disclosing the link information and the encrypted information of the common key and the original information to the one information terminal of the plurality of information terminals and the authorized information terminal; and a secure transport core having a program for performing encryption communication of the information transmitted/received via the communication network installed therein.

Although each information terminal has an encryption processing block according to the aforesaid configuration, the present invention also includes a configuration in which an external box is interposed in the connection portion between each information terminal and the Internet, and the external box is provided with a function for performing encryption processing. Further, the present invention also includes a configuration in which a proxy information terminal (a proxy server) for performing encryption processing is provided.

Incidentally, in such cases, the encryption processing is executed by a program installed in each information terminal, the external box, or the proxy server.

Advantages of the Invention

According to the present invention, it is possible to perform encryption communication between a client (a user) terminal and a server, or between client terminals via the Internet communication network. Further, it is possible for a user (an owner) who owns the original information (for example, an image x) to only allow a third person who is authorized to view or hold the information (for example, the image x) of the owner to reference or hold the information. In other words, it is possible for the owner to decide by himself (or herself) whether or not to allow the third person to decrypt and reference the stored encrypted image x, and therefore it is possible to provide an information distribution system having extremely high security.

BRIEF DESCRIPTION OF DRAWINGS

FIG. 4 is a flowchart showing a part of the flow of the processing of the medical information distribution system according to the first embodiment shown in FIG. 3, until the step of storing encrypted image;

BEST MODES FOR CARRYING OUT THE INVENTION

Figure 1:
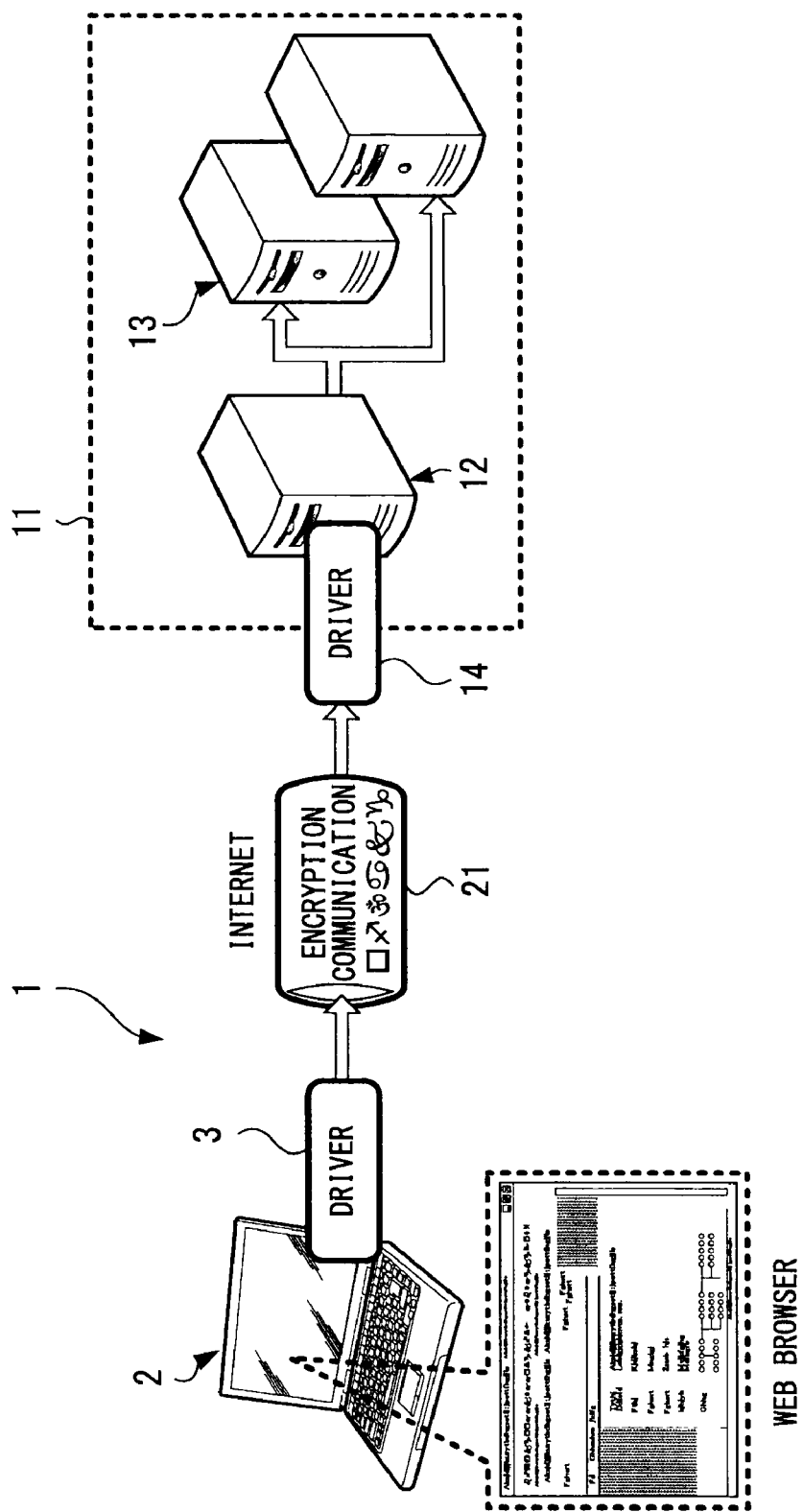
FIG. 1 is a conceptual rendering showing an information distribution system according to a first embodiment of the present invention.

First, a secure transport management function used in an information distribution system of the present invention will be explained before describing the embodiments of the present invention. The secure transport function, which is the substantial part of the present invention, constitutes a secure transport system (STS) which is configured by organically integrating a secure transport core (STC) and a secure storage system (SSS).

Herein, the secure transport core (STC) is, for example, software arranged on a transport layer for achieving end-to-end secure transport and has extension corresponding to various packet contents. In other words, in the secure transport core (STC), since all accesses to information (such as registering, referencing and changing information) are authenticated, and all communications are performed by encrypted secure transport, security of communication can be guaranteed. Further, since the original information is recorded remaining in the encrypted state as it was when performing secure transport, without being decrypted, the original information can not be stolen even by the administrator of the information server computer. Thus, it is possible to completely prevent information from being stolen.

Further, in the secure storage system (SSS), only addition and register of information are allowed, deletion of information is not allowed. Further, a signature of the creator of the information is added to the original information, which makes it possible to detect whether the information is falsified. Thus, the recorded original information is stored without being changed by any person. Further, since the change and/or addition added to the original information are recorded as new original information, falsification can be prevented. Furthermore, since the original information is stored in a state clearly defined by the owner, only the owner or a valid user authorized by the owner can use the stored information (i.e., the owner or a valid user can use the stored information).

In other words, the encrypted original information is stored in the center in a state where only the owner of the registered data and the valid user authorized by the owner can use the information. This feature leads to complete prevention of sniff/steal of the original information. Incidentally, in the secure storage system (SSS), only accumulation of information is possible, and the accumulated information will not be deleted until a period defined by the owner has elapsed. Thus, there is no concern that important information might be deleted by mistake.

Further, since register, update and reference of the information are recorded as history, the history record can be provided upon a submission request from the owner of the registered data or from the valid user authorized by the owner. Incidentally, the history record is also prevented from being falsified and deleted by the same method as that of the original information.

Further, since the owner and the valid user authorized by the owner are authenticated by a public key authentication method, it is also possible to prevent spoofing. Further, reference to the original information is also performed by secure transport, and when making copy, the information is record in the encrypted state as it was when performing transport. Incidentally, it is also possible to allow the owner to determine whether to authorize the valid user to only reference the original information, or to authorize the valid user to even make a copy, according to necessity.

Further, the owner of information may entrust another entity or a third person (a proxy) with the authority to issue the aforesaid authorization to the user. Further, the entrusted proxy may authorize the authority owned only by the owner to a particular user, within a range defined by the owner. Thus, "availability" of the information distribution system according to the present invention can be improved.

Further, in the secure storage system (SSS), when there is an action such as reference, addition and/or the like performed on the original information, the time of the action, the person who performs the action, and the content of the action will be recorded as log data. Since such information is stored in a manner in which the data can not be changed by any person, it is possible to accurately trace the information later.

Further, in the secure transport system (STS), processes such as secure transport, encrypted record and the like are executed with no need for the user to pay any attention or to make any change to application, except for actions such as authentication, to which the user has to pay attention. This property is called "application transparency".

Further, in the case where the information terminals are provided with no secure transport system (STS) function, a method can be used in which an external box having STS function installed thereto is added to the network on the side to which the information terminal is connected, so that it seems as if each information terminal is provided with STS function. This method can be achieved by employing a so-called gateway (GW) device, and thereby availability of the system of the present invention can be improved. The details of this method will be described later with reference to FIGS. 6 and 7.

Also, it is considerable that a proxy server serving as a proxy for providing STS function is provided, so that even in the case where the client terminal has no secure transport system (STS) function, STS can be available by using the proxy server. Thus, "availability" of the system according to the present invention can be improved. The details of this method will be described later with reference to FIGS. 8 and 9.

First Embodiment

The configuration and operation of an information distribution system according to a first embodiment (also referred to as "present embodiment" hereinafter) of the present invention will be described below with reference to FIGS. 1 to 5. Incidentally, although the present embodiment is described based on an example in which encryption communication is performed between a client terminal and a server in a data center and information processing is performed in both the client terminal and the server, obviously the same processing may also be performed between peer-to-peer client terminals. Herein, the client terminal and the server are collectively called "information processing terminal".

As shown in FIG. 1, in the information distribution system according to the present embodiment, a client terminal (a standard personal computer) having web browser display function and a data center computer 11 functioning as a server computer on the data center side are connected with each other though the Internet 21, which is a kind of communication network.

The data center computer 11 includes a web server 12 and a secure storage server group 13.

In the present embodiment, a driver 3 is installed on the client terminal 2 and a driver 14 is installed on the data center computer 11, the driver 3 and the driver 14 being each provided with function of the secure transport core, which is to be described later.

Next, basic configuration of the information distribution system according to the first embodiment of the present invention will be described below with reference to FIG. 2.

Figure 2:
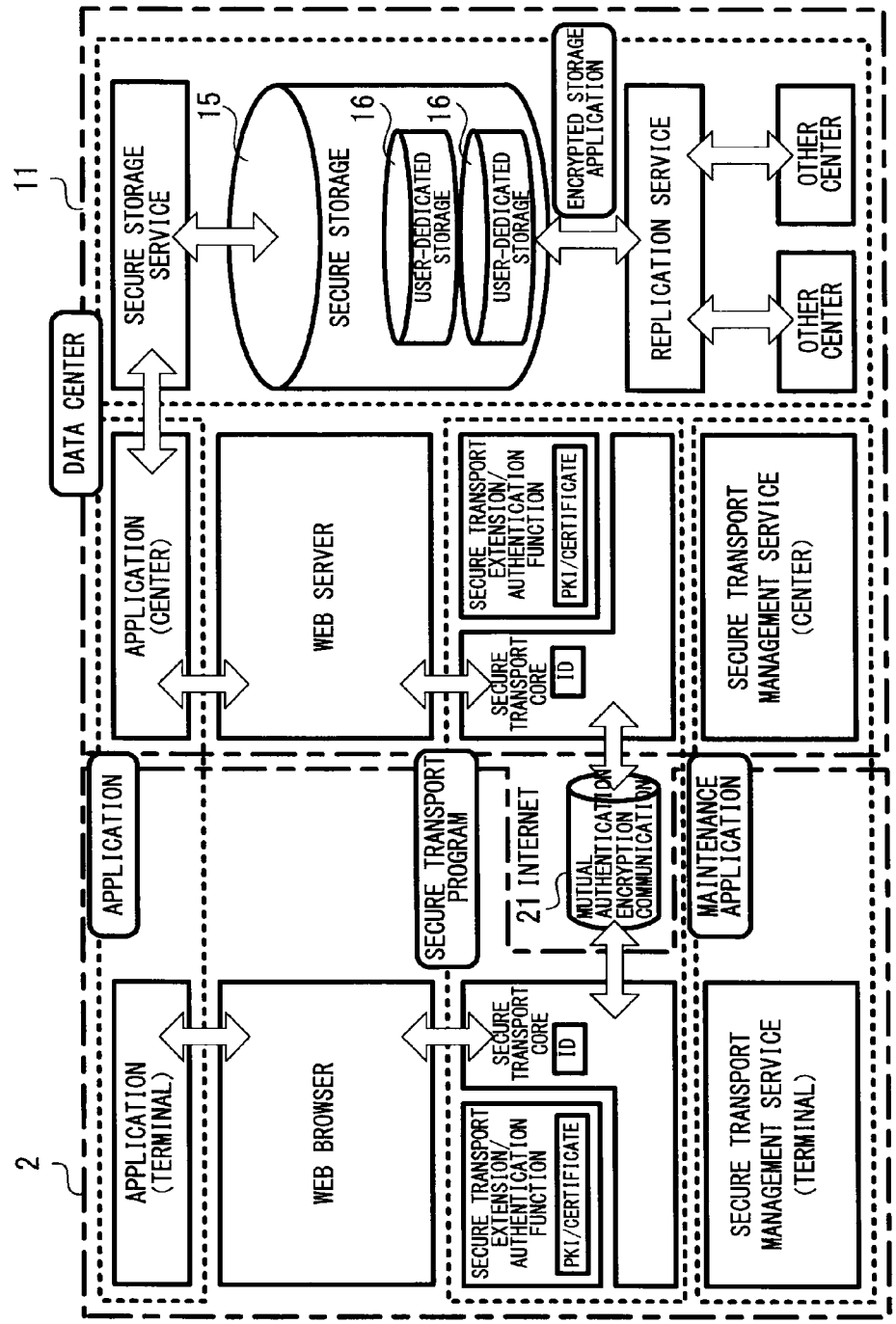
FIG. 2 is a block diagram showing the configuration of the information distribution system according to the first embodiment of the present invention.

FIG. 2 is a functional block diagram showing the function of the information terminal 2 and the data center computer 11, which are configured to achieve the secure transport system of the present embodiment.

As shown in FIG. 2, the information terminal 2 on the side of the client includes functions of an application adapted to store and reference information, a secure transport program, and a maintenance application, which are to be described later.

Herein, the application adapted to store and reference information includes a web browser, and is adapted to display and reference, for example, an image using the web browser.

Further, the secure transport program includes the secure transport core and a secure transport extension/authentication function. The secure transport core has a secure transport function for performing mutual authentication, encryption key exchange and encryption/decryption with the encryption key on the information transmitted/received between the information terminal 2 and the other information terminals (including the data center server 11) through the Internet 21.

Further, the secure transport core has a function for performing flexible grouping to allow or deny connection between the information terminals according to the type of TCP/IP based application, and for editing and processing the data stream of the information. Further, since a function for selecting extension corresponding to the application is provided depending on the content of the packet, security can be achieved without modifying the existing application.

Further, the secure transport extension/authentication function has the following four functions. The first function enables the creator of the information to encrypt a common key for encrypting the information to be stored using a public key of the owner of the information so that only the owner can reference the information. The second function enables the owner of the information to take out the common key, which was used when the creator of the information performed the encryption, to decrypt the information (data), and transfer the decrypted data to the application. Further, the third function enables the owner of the information to encrypt the common key with a public key of a third person trusted by the owner so as to allow the trusted third person to reference the information. The fourth function enables the user of the information (i.e., the trusted third person) to take out the common key, which was used when the owner of the information performed the encryption, to decrypt the information (data), and transfer the decrypted data to the application.

As shown in FIG. 2, the secure transport extension/authentication function has a role to transparently provide a service function of the secure transport core (STC) and the secure storage system (SSS) with respect to the information transport application. Herein, as mentioned above, the term "to transparently provide" means processing is executed with no need for the user to pay any attention or to make any change to application, except for actions such as authentication, to which the user has to pay attention.

Further, the secure transport extension/authentication function also provides general functions such as signing, compressing, encrypting/decrypting, decompressing and verifying the data stream of main application protocols such as HTTP (Hyper Text Transfer Protocol), FTP (File Transfer Protocol), SMTP (Send Mail Transfer Protocol), POP3 (Post Office Protocol version 3) and the like. By using the secure transport extension/authentication function, it is possible to securely maintain or store a plurality of encryption keys, and also, it is possible to access an agency where the private keys are archived. Further, it is possible to provide an access to a PKI (Public Key Infrastructure) which is a system for exchanging public keys.

Further, the data center computer 11 shown in FIG. 2 includes an application adapted to store and reference information, a secure transport program, an encrypted storage application, and a maintenance application.

The application adapted to store and reference information has a function for communicating the encrypted information between itself and the application of the client terminal through a web server, and storing the encrypted information in a secure storage of the encrypted storage application, or enabling reference of the stored encrypted information.

Further, the secure transport program has the same function as that of the information terminal 2, and is adapted to perform secure transport between the data center computer 11 and the information terminal 2 through the Internet 21. In addition to functions of the secure transport extension/authentication function of the information terminal 2, the secure transport extension/authentication function of the data center computer 11 further has a function for adding a signature of the creator to the encrypted original information. Thus, it is possible to more reliably prevent falsification of information.

The encrypted storage application of the data center computer 11 includes a secure storage service and a replication service. Further, the secure storage service is adapted to store information for each user in a respective one of a plurality of user-dedicated storages 16 of a secure storage 15 in the encrypted state, so that confidentiality can be protected. Further, the signature of the registrant is added, so that validity of the information can be confirmed. Further, it is possible to confirm that the information is not falsified.

Further, the secure storage service is adapted to provide the application on the center side with a function for storing the encrypted information in the user-dedicated storage 16 and referencing the information. At this time, all histories (logs) of register, update and reference of the information are recorded as evidence.

Further, the replication service of the encrypted storage application is adapted to automatically connect the data center 11 with a plurality of other centers and perform information synchronization of the secure storage. As a result, the information stored in one center is also stored in other centers simultaneously or with a predetermined time lag. Thus, even if the information storage of one center is damaged, the information can be obtained from the other centers, and therefore information can be prevented from being completely lost. This function ensures availability.

Incidentally, the maintenance application secure transport management service of the information terminal 2 and the data center computer 11 is adapted to manage the public keys of both the owner and the trusted third person. Further, the maintenance application is adapted to create and distribute the secure transport program to the information terminal that first uses the system, and the maintenance application is also adapted to perform license management of the program, change the setting of the program, monitor operation, collect log, and the like.

Further, the encrypted storage application is configured so that the encryption key is stored in the user-dedicated storage 16 in a state where the encryption key can only be used by the owner of the registered information and the "valid user" authorized by the owner (i.e., the trusted third person). Further, register, update and reference of the registered information are recorded as history, and the history can be provided upon a submission request from the owner of the registered information and from the "valid user" authorized by the owner.

Incidentally, in the encrypted storage application, amount of algorithms for analyzing and using the encryption key is great, and therefore it is extremely difficult for a third person to sniff/steal the data. Further, the registered information can not be changed, and will not be deleted until a predetermined period has elapsed. Thus, the information having be changed is accumulated as new information.

As described above, in the secure transport system (STS) of the present embodiment, by performing the encrypted secure transport, the original information is stored in the secure storage 15 owned by the original information server. Thus, it is safe to say that sniff and falsification of information can be almost completely prevented.

Further, since the original information is stored remaining in the encrypted state as it was when performing secure transport, without being decrypted, the original information is archived in a state where the original information can not be stolen even by the administrator of the server computer. Further, since the signature of the creator is added to the original information, the archived original information can not be changed except by the creator who signed the original information. Incidentally, even if the change and/or addition is added to the original information by the creator, since the change and/or addition is recorded as new original information, falsification of the original information can be prevented.

Herein, as an example of a mechanism for controlling reference of original information, a reference index will be described below. As described later, the original information can be decrypted and referenced only through the reference index. The reference index includes a link L to the original information and an encryption key of the original information encrypted with the public key of a reference person (a person who is allowed to reference the data). Thus, the reference person can decrypt the reference index and the original information with his (or her) private key, and read the decrypted original information.

At first, only the owner of the original information has the reference index. Then, the owner of the original information obtains the public key of a reference person who is authorized to reference the original information, creates a reference index for the reference person, and delivers the created reference index to the reference person so that the reference person can reference the original information. In other words, only the owner can add the reference index. With such a configuration, it is possible to retain the ownership of the owner and authenticate the reference person.

Figure 5:
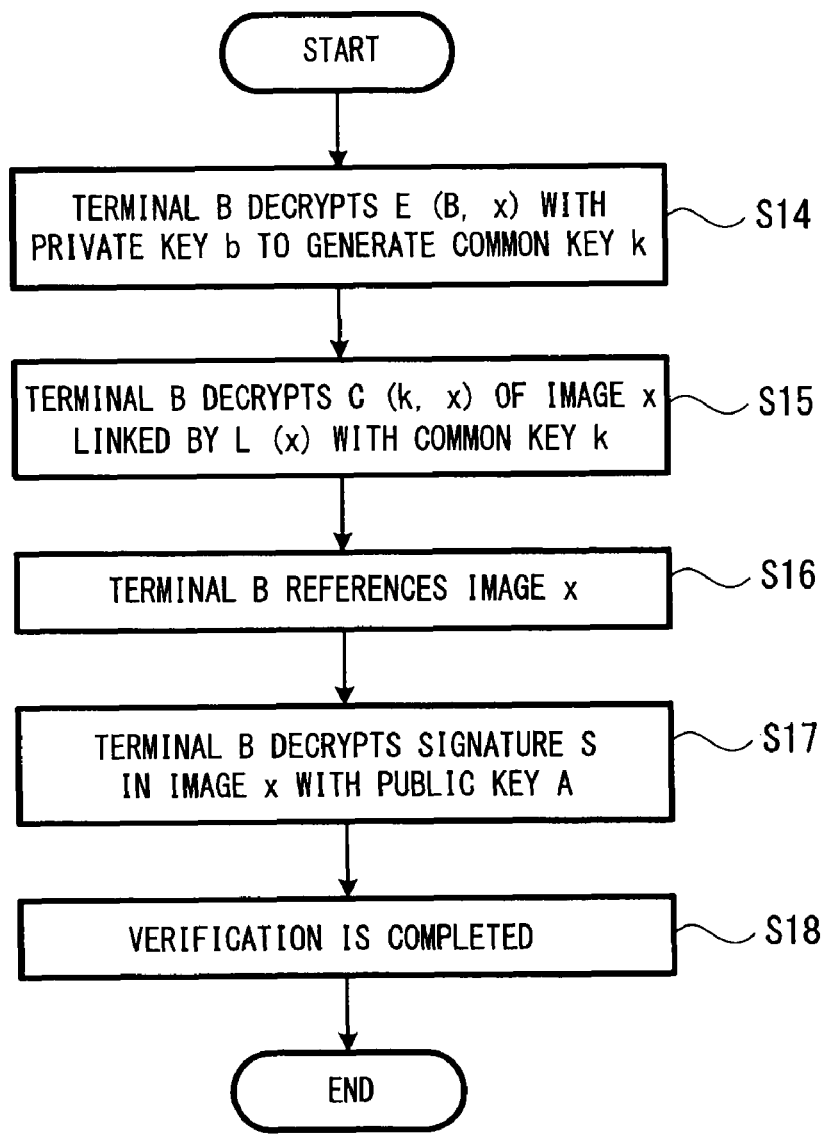
FIG. 5 is a flowchart showing another part of the flow of the processing of the medical information distribution system according to the first embodiment shown in FIG. 3, until the step of referencing and verifying the encrypted image.

Next, the processing of the information distribution system according to the embodiment of the present invention (the present embodiment) will be described below with reference to the block diagram of FIG. 3 and the flowcharts of FIGS. 4 and 5.

Figure 3:
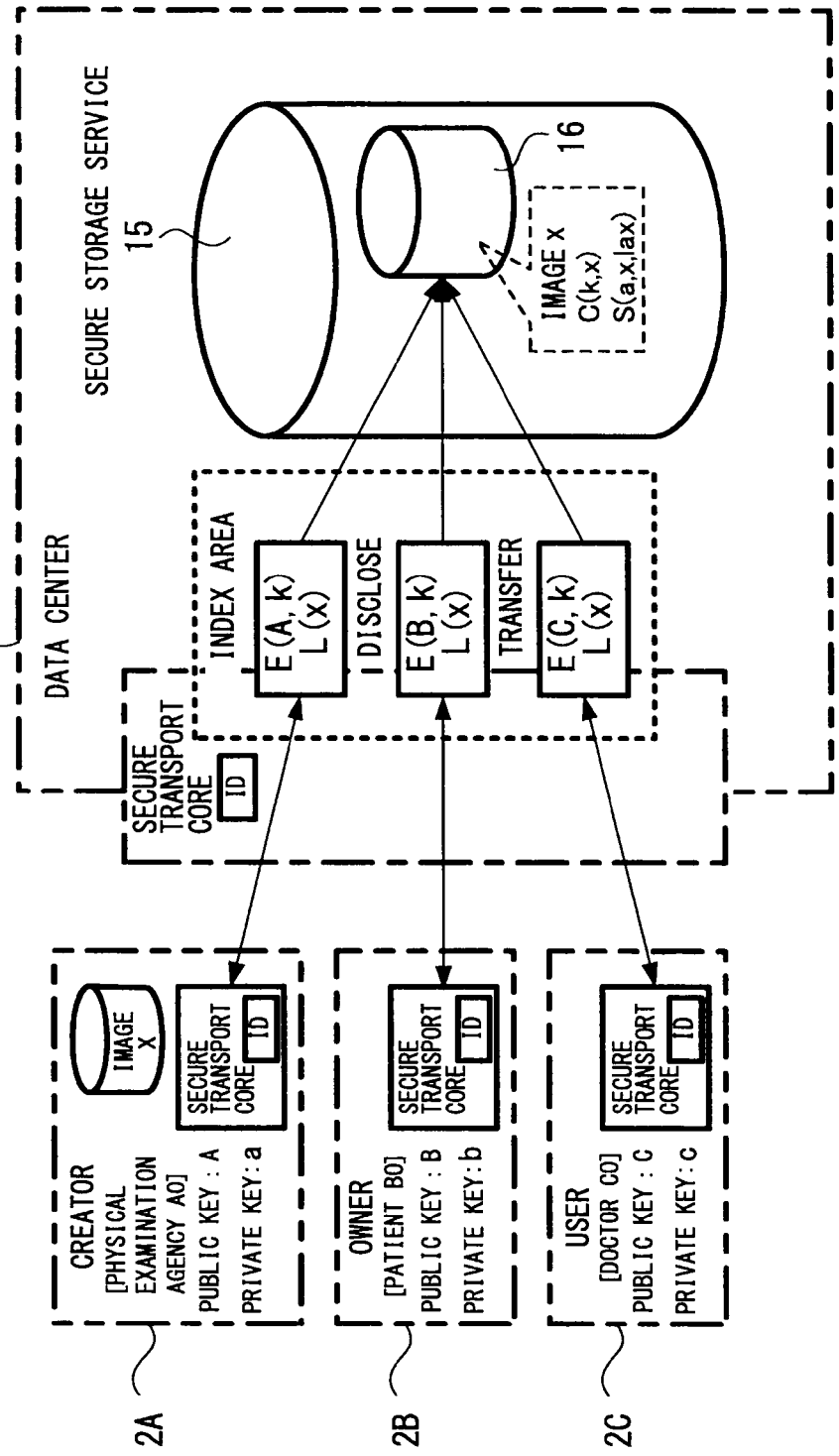
FIG. 3 is a schematic block diagram for explaining encryption processing and decryption processing in the case where the information distribution system according to the first embodiment of the present invention is used as a medical information distribution system.

FIG. 3 is made to describe the information distribution system according to the present embodiment in detail. In FIG. 3, an entity 2A is the creator who creates the original information x. In the case of the medical information distribution system of the present embodiment, the entity 2A is a physical examination agency A0 who creates the data. Further, an entity 2B is the owner of the original information, and in the medical information distribution system of the present embodiment, the entity 2B is a patient B0. An entity 2C is the user who can read the original information x, and in the present embodiment, the entity 2C is a doctor C0 who is a trusted third person. These entities 2A, 2B and 2C are connected to the data center computer 11 and perform the following processing using the secure storage 15 of the data center computer 11.

First, the entity 2A (i.e., the physical examination agency) creates the image x, as the original information owned by the entity 2B (i.e., the patient), and stores the created image x in an original information database (DB). Further, an encryption key (k) is generated by the secure transport core of the terminal of the entity 2A, and the image x is encrypted by the encryption key (k) and archived. Thereafter, information exchange is performed between the terminals or between the terminal and the center based on the generated encryption key (k). Incidentally, the entity 2A (i.e., the physical examination agency) registers the image x (i.e., the original information), and at the same time registers that the owner of the image x is the entity 2B (i.e., the patient). In other words, the entity 2A registers that the ownership of the image x belongs to the entity 2B (i.e., the patient).

It is needless to say that, when performing communication, the image x (i.e., the original information) is communicated in an encrypted state, the image x remains in the encrypted state even when being stored in the secure storage 15 of the data center computer 11. Thus, the image x can not be decrypted even by the owner of the server (i.e., the center) if the owner of the server does not know the encryption key (k). Further, the data registered in the secure storage 15 of the data center computer 11 is unique, and the data can not be falsified by anyone. In other words, it is possible for the entity 2B (i.e., the patient), the owner of the data, to only authorize a trusted third person, such as the entity 2C (i.e., the doctor) who is a valid user authorized by the owner, to decrypt the data.

Next, the details of the operation of the information distribution system shown in FIG. 3 will be described below with reference to the flowcharts of FIGS. 4 and 5. In the following description of the medical information distribution system, the entity 2A (the creator of the original information) is the physical examination agency A0, the entity 2B (the owner of the original information) is the patient B0, the entity 2C (the user of the original information) is the doctor C0, and the information terminals owned by the respective entities are respectively information terminals 2A, 2B and 2C.

Herein, the information terminal 2A of the physical examination agency A0 holds a public key A, a private key a and its own ID, wherein the public key A and the private key previously set as a pair; and the information terminal 2B of the patient B0 holds a public key B, a private key b and its own ID. Similarly, the information terminal 2C of the doctor C0 holds a public key C, a private key c and its own ID.

In the secure storage service of the data center computer 11, the index information is generated, and at the same time the original information x in plaintext is compressed and encrypted, and the compressed and encrypted original information x is stored in the database. Although the original information x may include the other data than the image, since the original information shown in FIG. 3 is the image x, hereinafter the original information x and the image x are regarded as the same.

Index information E (A, k) means encrypted information obtained by encrypting the encryption key (k) with the public key A of the physical examination agency A0, and similarly, index information E (B, k) and index information E (C, k) mean encrypted information obtained by encrypting the encryption key (k) respectively with the public key B and public key C. Further, link information L (x) is information indicating whereabouts of the data such as a URL, a file name or the like, and herein the link information L (x) means information indicating the location where the encrypted image x is stored in the secure storage 15.

The original information (image x) in plaintext is compressed and encrypted, and the encrypted image x is stored in the secure storage of the data center computer 11. Such information is indicated as C (k, x), which means the information of the encrypted image x encrypted with the encryption key k. In addition to the encrypted information C (k, x), also stored in the secure storage of the data center computer 11 is S (a, x), which indicates the signature (evidence) of the physical examination agency A0 who stores the image x.

Next, the flow of the processing of the information distribution system according to the first embodiment of the present invention will be described below with reference to the flowcharts of FIGS. 4 and 5.

As shown in FIG. 4, first, a digitized image x is generated with an image of the patient B0 photographed by the physical examination agency A0 (Step S1).

At this time, the physical examination agency A0 is the "registrant of the data", and the patient B0 is the "owner of the data". The doctor C0 is regarded as the "user of the data" authorized to reference the data by the patient B0 who is the "owner of the data". Usually, the patient B0 is the person who authorizes the doctor C0 to reference the data, however the patient B0 may also entrust the physical examination agency A0 to issue such authorization on behalf of him (or her). It is obvious that the information distribution system may also be used in a wide variety of usages such as electronically managing the assets such as stocks and the like, instead of being limited to the medical case.

Next, generation and exchange of the encryption key with the common key is performed (Step S2). To be specific, Step S2 is a process for performing mutual authentication between the secure transport core on the terminal side and the secure transport core on the center side in the system configuration shown in FIG. 3, and generating and exchanging the encryption key k with the common key. Here, the secure transport core of the information terminal 2A of the physical examination agency A0 is connected with the secure transport core on the center side through the Internet 21, and the image x is transmitted to the data center computer 11 using the secure transport core on the center side. Further, before storing the image x in the user-dedicated storage 16, it is necessary to firstly perform mutual authentication between the secure transport core of the physical examination agency A0 and the secure transport core of the data center computer 11 and exchange the encryption key before storing the data, as describe above.

Next, the image x is compressed and encrypted using the common key k generated in Step S2, and the compressed and encrypted information is stored in the user-dedicated storage 16 of the data center computer 11 (Step S3). Such compressed and encrypted information encrypted using the encryption key k is indicated as C (k, x). Further, in order to prove that the data is registered by the physical examination agency A0, a signature S (a, x, lax) is added as additional information of the encrypted information C (k, x). Herein "a" represents the private key of the physical examination agency A0, "x" represents the image, and "lax" represents the content of the signature. The content of the signature "lax" represents a profile such as, for example, the name of the physical examination agency A0, the address of the physical examination agency A0, data and time when the image was photographed, and the like. After Step S3 is completed, the encrypted image x is stored, as a set of [C (k, x) and S (a, x, lax)] (with signature), in the user-dedicated storage 16 of the data center computer 11 (Step S4).

Incidentally, when storing the data in the user-dedicated storage 16 of the data center computer 11, the information terminal 2A of the physical examination agency A0 encrypts the common key with the public key of the physical examination agency A0. The encrypted information is regarded as E (A, k) (Step S5). Thereafter, link information L (x) linking the actual encrypted image x stored in the user-dedicated storage 16 is generated (Step S6). Finally, the information E (A, k) generated in Step S5 and the link information L (x) are paired, and thereby the index information for the physical examination agency A0 is generated (Step S7).

At the same time, in order to disclose the secure information of the image x to the patient B0, the information terminal 2A of the physical examination agency A0 encrypts the common key k with the public key B of the patient B0. Such encrypted information is regarded as E (B, k) (Step S8). Thereafter, similar to Steps S6 and S7, the link information linking the actual encrypted image x stored in the user-dedicated storage 16 is regarded as L (x) (Step S9), and the information E (B, k) and the link information L (x) are paired, and thereby the index information for the patient B0 is generated (Step S10).

Further, the common key k is encrypted with the public key C of the doctor C0 either at the information terminal 2A of the physical examination agency A0 or at the information terminal 2B of the patient B0. This processing is performed for allowing the doctor C0 to view the encrypted image x. The information of the common key k encrypted with the public key C is regarded as E (C, k) (Step S11). Further, similar to Steps S6 and S9, the link information linking the actual encrypted image x stored in the user-dedicated storage 16 is regarded as L (x) (Step S12). Further, the information E (C, k) generated in Step S12 and the link information L (x) are paired, and thereby the index information for the doctor C0 is generated (Step S13).

The flow of the processing until generating index information based on the public keys of the information terminals of the physical examination agency A0, the patient B0 and the doctor C0 so that the image x owned by the patient B0 can be viewed from the respective terminals has been described above description with reference to the flowchart of FIG. 4.

As secure storage service of the data center computer 11, the aforesaid index information is respectively provided to the information terminal 2A, 2B and 2C of the physical examination agency A0, the patient B0 and the doctor C0 through the Internet 21.

Next, a case where the patient B0 references or verifies his (or her) own image x will be explained below with reference to the flowchart of FIG. 5.

First, the information terminal 2B of the patient B0 performs communication between itself and the data center computer 11 with the secure transport core of itself, takes out E (B, k) of its own index information [E (B, k) and L (x)], and decrypts the E (B, k) with the private key b, which is paired with its own public key B, to extract the common key k (Step S14).

Thereafter, base on the link information L (x), the information terminal 2B of the patient B0 decrypts the C (k, x) of the linked encrypted image x [C (k, x) and S (a, x, lax)] using the common key k (Step S15). Thus, the patient B0 can reference his (or her) own image x (Step S16).

Further, in order to confirm whether the image x is his (or her) own image, the patient B0 uses the information terminal 2B to access the image x [C (k, x) and S (a, x, lax)] stored in the secure storage 15 of the data center computer 11 to acquire the signature S (a, x, lax) in the encrypted image x. Further, based on the signature S (a, x, lax), the patient B0 verifies that the encrypted image x is identical to his (or her) own original image x, namely, verifies the validity of the encrypted image x. The validity of the image x can be confirmed by decrypting the signature S (a, x, lax) with the public key A, which is paired with the private key a of the physical examination agency A0 (Step S17), and thereby verification of the validity is completed (Step S18).

Further, similar to the aforesaid case, the information terminal 2C of the doctor C0 can perform communication between itself and the data center computer 11, and decrypt E (C, k) of its own index information [E (C, k) and L (x)] with the private key c, which is paired with its own public key C, to extract the common key k. Further, after extracting the common key, the doctor C0 can reference the image x of the patient B0 by accessing the encrypted image x [E (C, k) and L (x)] linked by the link information L (x) and decrypting the C (k, x) of the image x with the common key k.

As described above, in the information distribution system according to the first embodiment of the present invention, the information terminal 2A of the physical examination agency A0 performs compressing, encryption and encryption communication of the image from the web browser thereof.

In the information distribution system according to the first embodiment of the present invention, information terminals 2A to 2C each have a program indicated as the driver 3 shown in FIG. 1 installed therein. Similarly, the data center computer 11 also has a program indicated as the driver 14 installed therein. With such a simple configuration, encryption communication between each of the information terminals 2A to 2C and the data center computer 11 can be performed via the Internet 21. In such a case, only the third person authorized by either the physical examination agency A0 who is the registrant of the original image x or the patient B0 who is the owner of the original image x can decrypt the encrypted image x and view the image, that is, only the doctor C0 who owns the information terminal 2C can decrypt the encrypted image x and view the image.

Thus, the information distribution system according to the present embodiment is an extremely secure system in which information can be referenced and used only by the person who is authorized by either the owner or the registrant of the information.

Further, the encrypted image x (i.e., the data) registered in the secure storage 15 of the data center computer 11 is unique data with compliance, which can not be falsified by anyone. Obviously, since the person on side of the data center computer 11 has no private key and therefore can not decrypt the encrypted image x and reference the image, so that the information distribution system according to the present embodiment has extremely high security. Further, as described above, the patient B0 can verify validity of his (or her) own image x by performing extremely simple operation.

As described above, in the present embodiment, the information terminal 2 (the terminal of the client) holds the public key and the private key, and generates the common key when performing communication between itself and the data center computer 11 via the Internet 21.

Further, encryption processing for encrypting the original information is performed with the generated common key, and the common key is encrypted using the public key of the other information terminal. The index information, which is configured by the encrypted common key and the link information linking the encrypted information of the original information, is generated in order to disclose the encrypted information of the original information to the other information terminal.

Further, the common key is extracted using the private key, and decryption of the encrypted information of the original information is performed using the extracted common key. Further, communication between all information terminals are performed by encryption communication, and the program for achieving the secure transport system is installed in all information terminals.

Further, the data center computer 11 has a program installed therein, wherein the program at least performs operations of: generating the common key, performing the encryption communication of information transmitted and received via a communication network, storing the encrypted information of the original information, and generating the index information on the encrypted information of the original information. Incidentally, the program installed in the data center computer 11 may also be reversely held by information terminal 2 on the side of the client. In other words, in the case where the program installed in the information terminal 2 of the client and the program installed in the data center computer 11 are reversely held by each other, it is also possible to provide an application system having high security.

Figure 6:
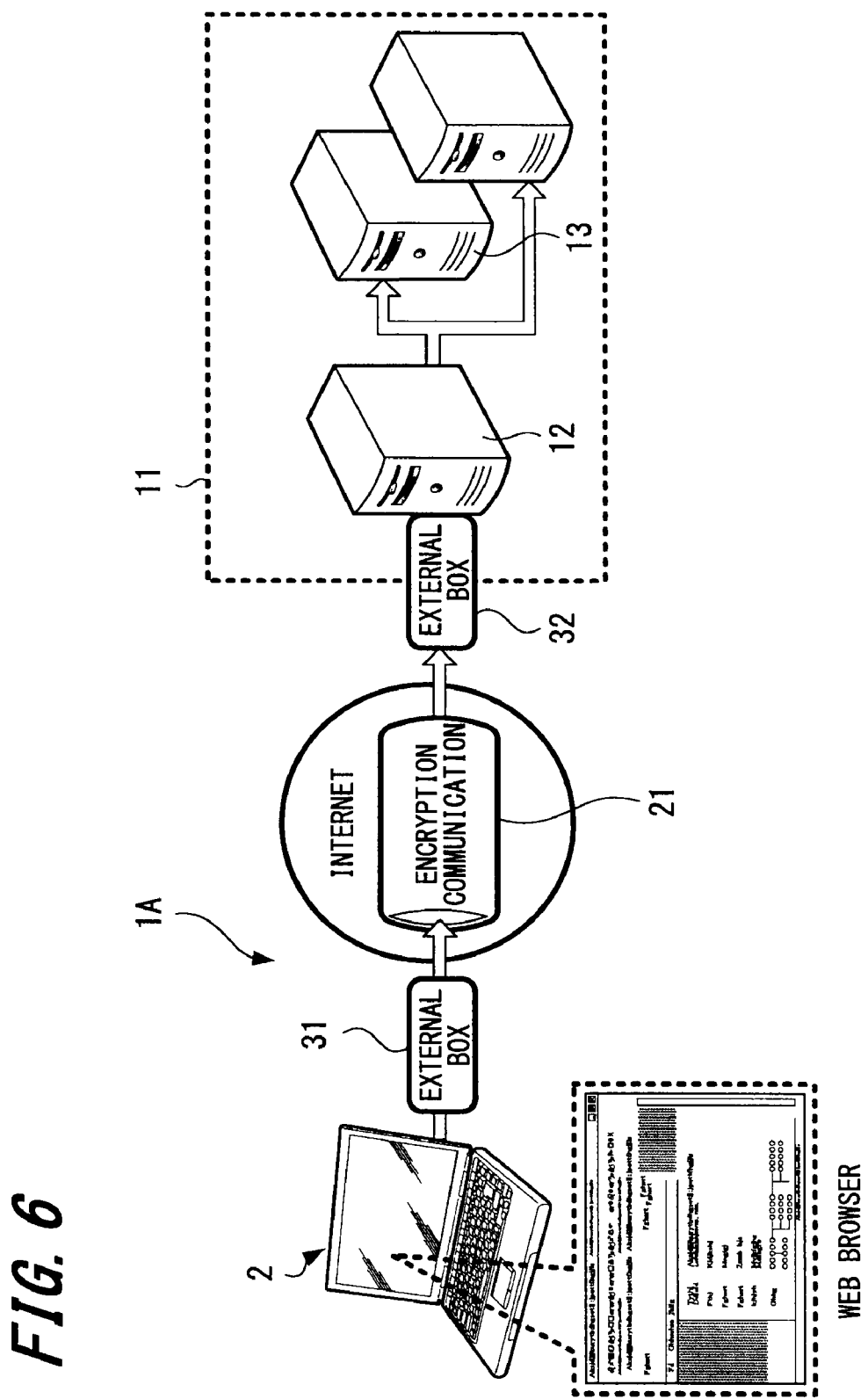
FIG. 6 is a conceptual rendering showing an information distribution system according to a second embodiment of the present invention.
Figure 7:
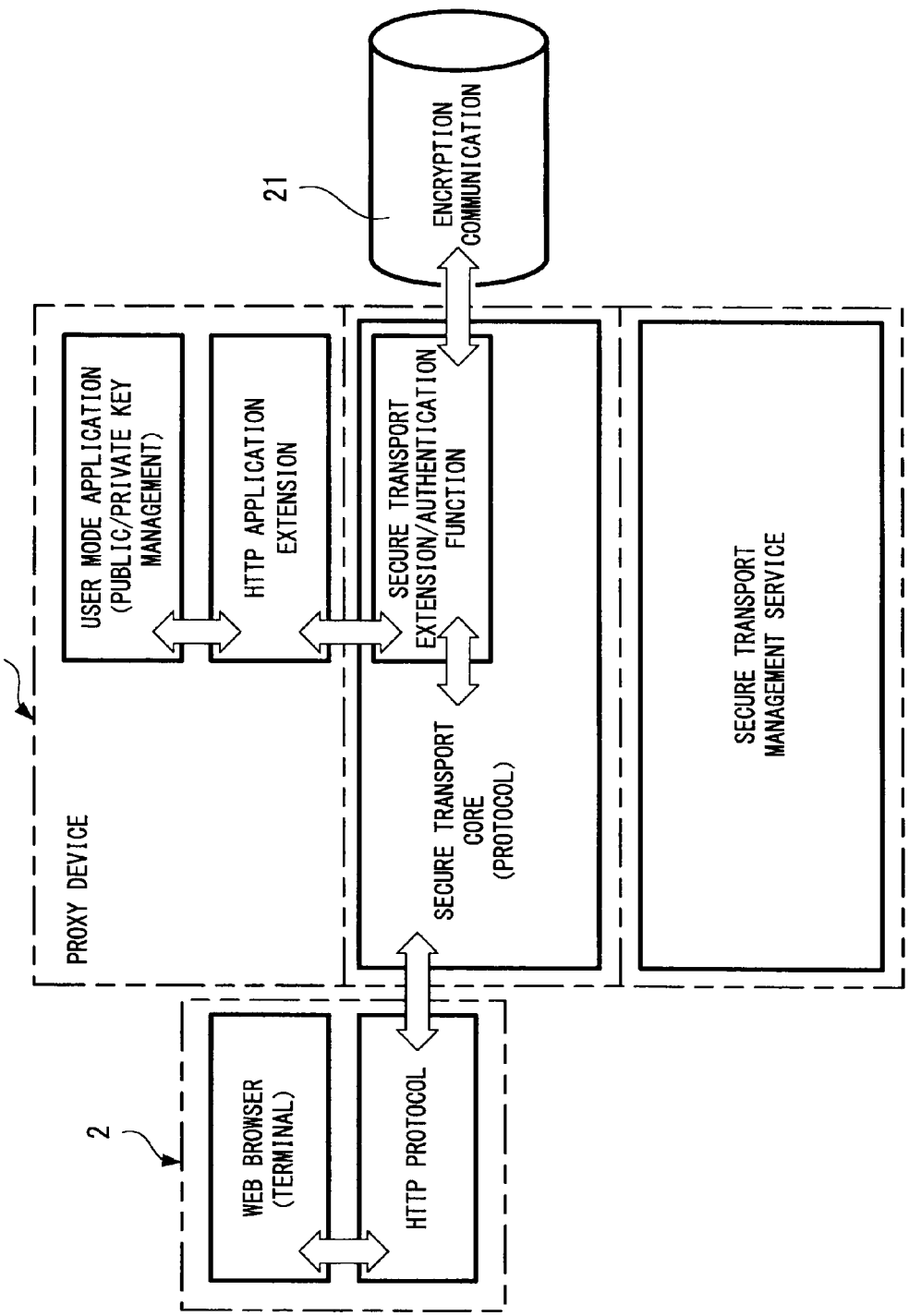
FIG. 7 is a block diagram explaining the function of external boxes of the information distribution system according to the second embodiment of the present invention.

In addition, although the aforesaid embodiment is described using an example in which encryption communication and processing are performed between an information terminal (a client) and a center computer (a server), it is obvious that, in the present embodiment, encryption communication may also be performed between information terminals, such as peer-to-peer terminals, without particularly needing a server on one side Second Embodiment Next, an information distribution system according to a second embodiment of the present invention will be described below with reference to FIGS. 6 and 7.

As shown in FIG. 6, similar to the first embodiment, the system according to the second embodiment is configured by connecting the information terminal 2 of the client side, which has a web browser display function, with the data center computer 11 through the Internet network 21. Also, the system of the second embodiment is identical to that of the first embodiment (see FIG. 1) in that the data center computer 11 is provided with the web server 12 and the secure storage server group 13.

The system of the second embodiment differs from that of the first embodiment (see FIG. 1) in that an external box 31 and an external box 32 are respectively provided between the information terminal 2 of the client side and the Internet network 21 and between the data center computer 11 and the Internet network 21. The external boxes have the secure transport core, the secure transport extension/authentication function and the like owned by the information terminal 2 of the first embodiment. In other words, the external boxes 31 and 32 are used as proxy devices of the client terminal 2 and the data center computer 11 shown in FIG. 1.

The external boxes 31 and 32 are typically each a dedicated device, however an appliance configured by installing dedicated software in a general-purpose equipment, such as a personal computer, may also be used as each of the external boxes 31 and 32.

FIG. 7 shows internal structure of each of the external boxes 31 and 32. As shown in FIG. 7, the external boxes (the proxy devices) 31 and 32 each include a secure transport core, which is adapted to perform encryption/decryption with an encryption key of the information transmitted/received via the Internet 21, and a secure transport management service function, which is a maintenance application. Further, the external boxes 31 and 32 each include a user mode application for managing public key, and HTTP application extension.

Further, as shown in FIG. 7, in the information distribution system according to the second embodiment, the information terminal 2 (the client) need not to be provided with a secure transport application, because the external box 31 performs this function instead. In other words, the information terminal 2 on the side of the client is connected with the external box 31, and the data center computer 11 is connected with the external box 32. With such a configuration, even in the case where the information terminal 2 and the data center computer 11 are provided with no the secure transport application, encryption communication can be performed between the information terminal 2 and the data center computer 11 through the Internet 21.

Similar to the case of the first embodiment, in the system of the second embodiment, by employing the system construction shown in FIG. 3, only the person (the user) authorized by the actual owner of the information can decrypt the encrypted information and reference the information, therefore it is possible to achieve a system having extremely high security.

Further, similar to the system of the first embodiment, in the system of the second embodiment, the specific information, which is encrypted and registered data, can not be changed. Further, since the person on side of the data center computer 11 has no private key and therefore can not decrypt and reference the information, so that it is possible to achieve a system having extremely high security.

Furthermore, since the information distribution system according to the second embodiment of the present invention is simply configured by connecting the external box 31 to the information terminal 2 and connecting the external box 32 to the data center computer 11, encryption communication between the information terminal 2 of the client side of and the data center computer 11 can be achieved simply by connecting the both external boxes 31 and 32. Since the system is configured by adding the external boxes only, encryption communication and processing can be relatively easily achieved even using a computer system which has already in operation.

Third Embodiment

Next, an information distribution system according to a third embodiment of the present invention and a program therefor will be described below with reference to FIGS. 8 and 9.

Figure 8:
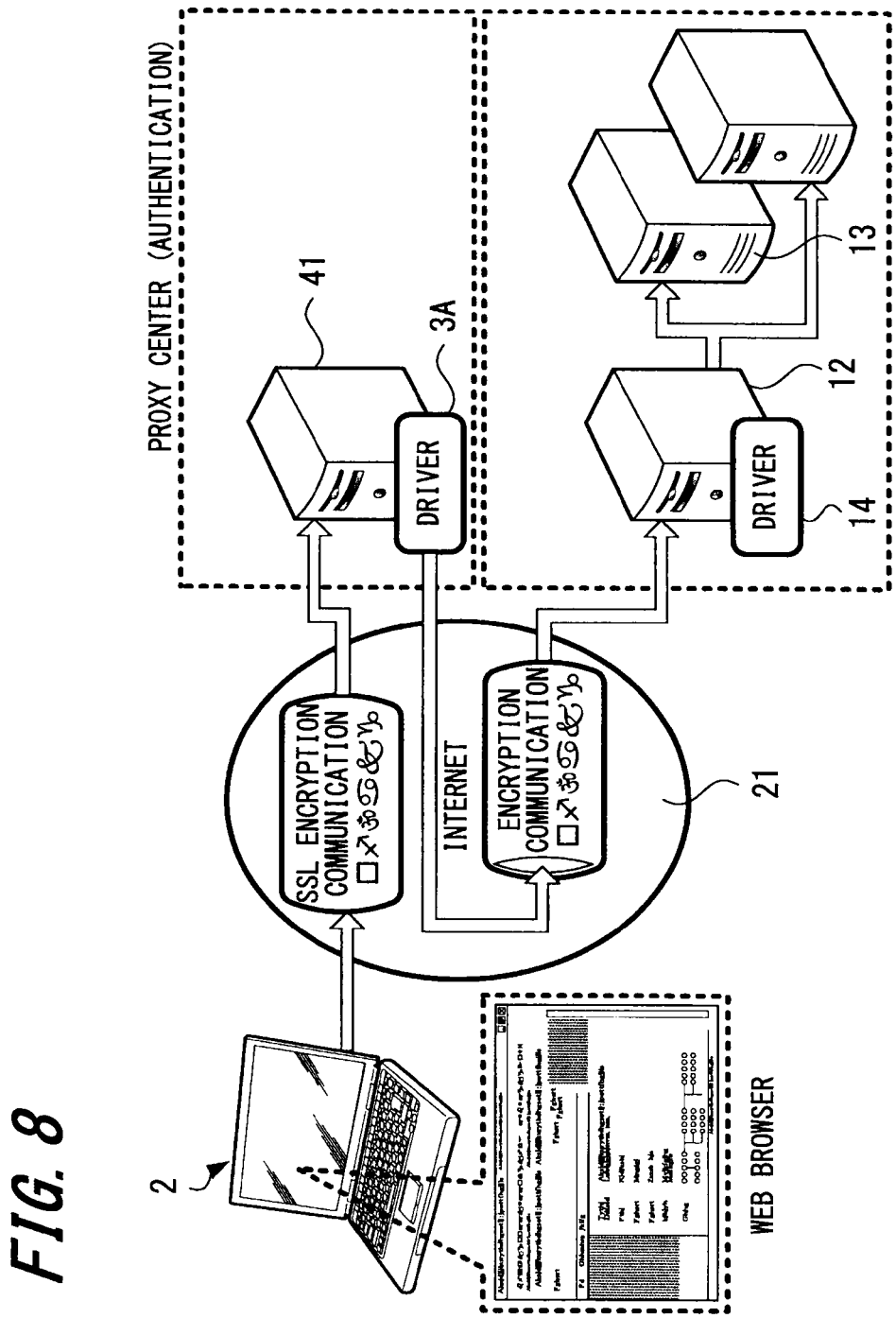
FIG. 8 is a conceptual rendering showing the schematic configuration of an information distribution system according to a third embodiment of the present invention.

As shown in FIG. 8, in the information distribution system according to the third embodiment of the present invention, the information terminal 2 (the client) is a usual personal computer having web browser display function. In other words, the information terminal 2 is a personal computer such as a windows (registered trademark) personal computer, in which a SSL (Secure Socket Layer) for performing usual encryption communication is standard-installed.

On the other hand, in the third embodiment of the present invention, in addition to the data center computer 11 which includes the web server 12 and the secure storage server group 13, a secure transport server 41 is provided as a proxy center (a proxy server: an application service provider).

The secure transport server 41 is connected so as to be able to perform encryption communication with the information terminal 2 on the client side through the Internet (the Internet network) 21 using, for example, the standard-installed SSL, and at the same time to perform encryption communication with the web server 12 of the data center computer 11 through the Internet 21.

Further, the secure transport server (the proxy server) 41 is configured so as to be able to achieve authentication between the information terminal 2 on the client side and the proxy server 41 at, for example, a transport layer located lower than the SSL application layer.

Further, a driver 3A substantially identical to the driver 3 (see FIG. 1) of the system of the first embodiment is installed in the secure transport server 41, and similarly, a driver 14, which is equivalent to the driver of the system of the first embodiment, is installed in the web server 12 of the data center computer 11.

Figure 9:
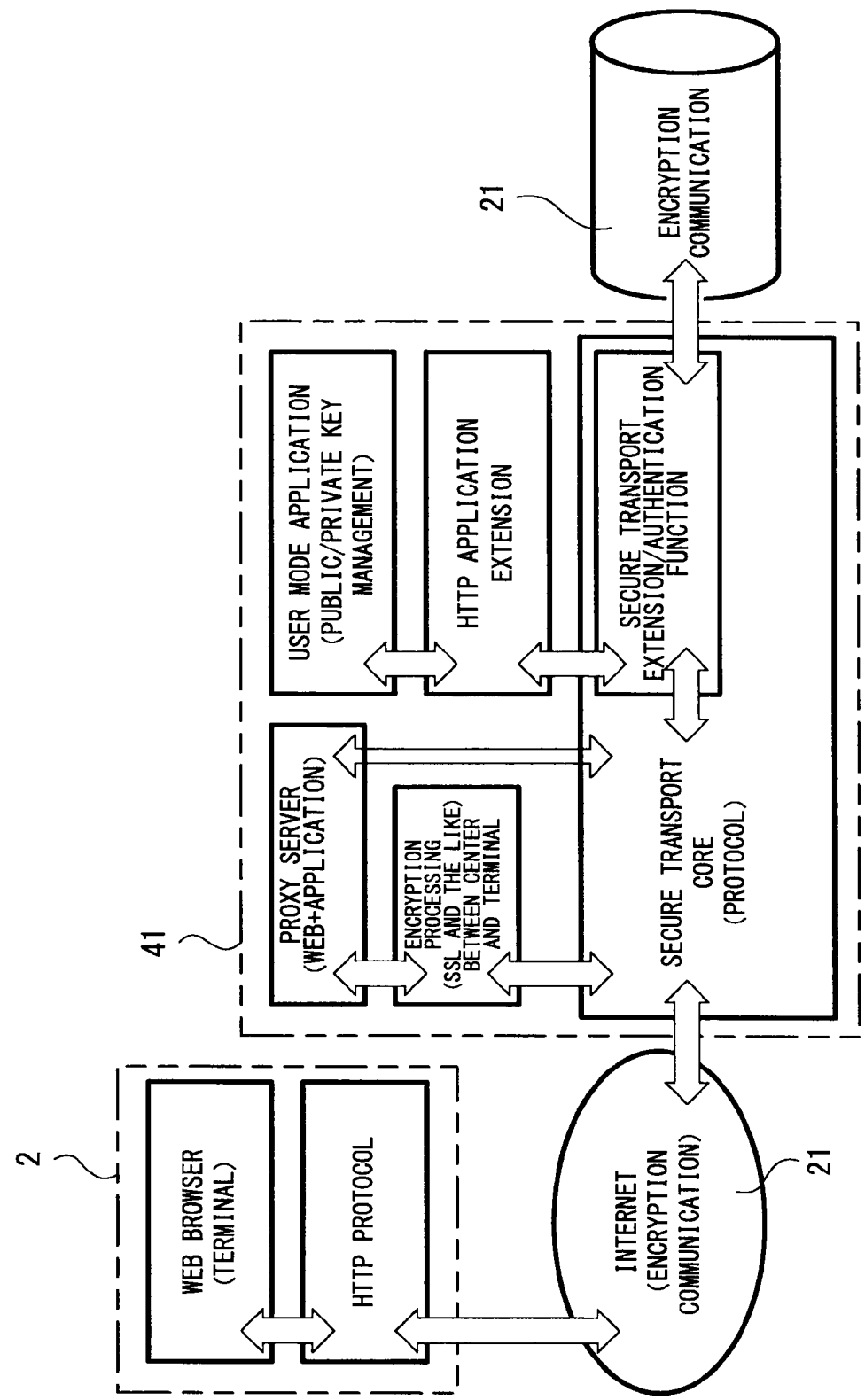
FIG. 9 is a block diagram explaining the function of a proxy server (a secure transport server) of the information distribution system according to the third embodiment of the present invention.

In other words, as shown in FIG. 9, the secure transport server 41 not only has the proxy server (web+application), but also has the SSL application adapted to achieve encryption processing (SSL) between the data center computer 11 and the information terminal 2.

Further, similar to the first embodiment, the secure transport server 41 includes the secure transport application for performing encryption/decryption with the encryption key of the transmitted/received information, and further includes the driver 3A which includes a user mode application for managing public encryption key and HTTP application extension.

As described above, according to the third embodiment of the present invention, the communication between the information terminal 2 of the client and the secure transport server 41 via the Internet 21 is achieved by SSL encryption communication. On the other hand, the communication between the secure transport server 41 and the web server 12 of the data center computer 11 via the Internet 21 is achieved by encryption communication identical to that of the first embodiment.

In such a case, similar to the first embodiment, by employing the system construction shown in FIG. 3, only the person (the user) authorized by the owner of the information can decrypt the encrypted information and reference the information, therefore it is possible to achieve a system having high security.

Further, similar to the cases of the first and second embodiments, the specific information (the encrypted and registered data) is stored in a state where the data can not be changed. Further, since the person on side of the data center computer 11 has no private key and therefore can not decrypt and reference the information, it is possible to achieve a system having extremely high security.

The following advantages can be obtained by using the information distribution system of the present invention and the program for achieving the system.

(a) Information is delivered by an end-to-end secure communication, and the information is stored in the encrypted state as it was when performing communication.

(b) Owner of the information is clearly defined, and only a trusted user authorized by the owner can access the information.

(c) Information is stored in a manner in which the information can not be falsified, and change of the information is recorded as new information.

(d) All accesses to information (such as reference, update, deletion and the like) are recorded, and all these records are stored in a manner in which the records can not be falsified.

(e) These security mechanisms are incorporated in a manner in which the user and the application are not aware of these mechanisms.

Further, since the system according to the third embodiment of the present invention is an ASP (Application Service Provider) type system in which the secure transport server 41 of the proxy center is interposed, the system is a user-friendly system available to many users who use the window (registered trademark) personal computer.

Although the embodiments of the present invention are described above, it should be noted that the system configurations described above are only examples of the present invention, and the present invention includes various other modifications and applications without departing from the spirit of the claims of the present invention. Further, although the embodiments are described mainly based on an example in which the encryption communication is performed between a client terminal and a server terminal, obviously the same encryption communication may also be performed between information terminals such as P2P terminals. Further, obviously the number of the information terminals to be connected is not particularly limited.

INDUSTRIAL APPLICABILITY

The present invention can be widely applied to encryption communication of all kind of information and decryption processing by a specified user, in addition to the aforesaid encryption communication of the medical image and decryption processing by a specified user.

EXPLANATION OF REFERENCE NUMERALS 1 information distribution system
2 client terminal (information terminal)
2A information terminal of creator (physical examination agency)
2B information terminal of owner (patient)
2C information terminal of user (doctor)
3, 3A, 14 driver
11 data center computer
12 web server
13 secure storage server group
15 secure storage
16 user-dedicated storage
21 Internet
31, 32 external box
41 proxy center (secure transport server)
A0 physical examination agency
B0 patient
C0 doctor
A, B, C public key
a, b, c private key
x image

The invention claimed is:

1. An information distribution system, comprising:
a plurality of information terminals connected to a communication network, wherein
at least one information terminal of the plurality of information terminals comprises
a common key generating section adapted to generate a common key for performing an encryption communication between the at least one information terminal and another information terminal via the communication network;
an original information encrypting section adapted to encrypt original information owned by any one of the plurality of information terminals based on the common key;
a section adapted to store a public key and a private key to encrypt the common key;
a common key encrypting section adapted to encrypt the common key with the public key;
a common key extracting section adapted to extract the encrypted common key with the private key;
a decryption processing section adapted to decrypt encrypted information of the original information encrypted by the at least one information terminal based on the extracted common key;
an encrypted signature generating section adapted to generate an encrypted signature using the private key; and
a secure transport core having a program for achieving the encryption communication installed therein, at least one information terminal of the other information terminals of the plurality of information terminals comprises
a secure storage including an original information storing section adapted to store the encrypted original information encrypted by the at least one information terminal of the plurality of information terminals in an encrypted state;
an authorized terminal authenticating section adapted to authenticate an authorized information terminal of the plurality of information terminals that is authorized to view the original information by an information terminal that owns the encrypted original information;
a link information generating section adapted to generate link information for linking encrypted information of the common key to the encrypted information of the original information;
an index information generating section adapted to generate index information for disclosing the link information and the encrypted information of the original information to the at least one information terminal of the plurality of information terminals and the authorized information terminal, wherein the at least one information terminal of the other information terminals of the plurality of information terminals provides the index information to the authorized information terminal; and
a secure transport core having a program for performing an encryption communication of information transmitted/received via the communication network installed therein, and
the authorized information terminal decrypts the index information with a private key of the authorized information terminal to extract the common key, and decrypts, using the common key, the encrypted information of the original information, based on the link information.

2. The information distribution system according to claim 1, wherein the at least one information terminal of the plurality of information terminals is a computer of an owner who owns the encrypted original information or a computer of a creator who creates the original information owned by the owner,
the at least one information terminal of the other information terminals of the plurality of information terminals is an information terminal which functions as a server adapted to perform an encryption communication with the at least one information terminal of the plurality of information terminals and to store data in the secure storage,
the at least one information terminal of the other information terminals is configured so that whether or not the original information is falsified can be detected by detecting whether or not there is a signature of the creator added to the original information,
a change and a deletion of the stored original information are not allowed, only a registration of the original information is allowed,
when the original information is corrected, the correction will be registered as new information, and,
to prevent information from being lost, the at least one information terminal which registers the original information automatically backs up the original information on a secure storage of another server linked therewith.

3. The information distribution system according to claim 1 or 2, further comprising:

an access history recording section adapted to record an access history of access to the original information, the access defined by at least one of a reference and a correction, along with a type of the access, a terminal that performs the access, and a time of the access, wherein the access history is automatically backed up on a secure storage of a server linked with the at least one information terminal which registers the original information.

4. The information distribution system according to claim 1 or 2, wherein the at least one information terminal of the plurality of information terminals is an information terminal having an index for performing an authentication of the link information to the original information stored in the secure storage and an authentication of the terminal that performs access.

5. The information distribution system according to claim 1 or 2, wherein the program installed in the at least one information terminal of the plurality of information terminals and the program installed in the at least one information terminal of the other information terminals of the plurality of information terminals are included in a state where the programs are each installed in a layer below an application layer, the programs being adapted to perform an encryption communication through the communication network.

6. An information distribution system, comprising:
a plurality of information terminals connected to a communication network, wherein one information terminal of the plurality of information terminals and at least one of the other information terminals of the plurality of information terminals are each connected to the communication network through an external box, the one information terminal is an information terminal used by an owner of the information, an information terminal used by a creator of the information, or an information terminal used by a user of the information,
the at least one of the other information terminals of the plurality of information terminals is an information terminal having a secure storage adapted to store original information created by the one information terminal in an encrypted state,
the external box is provided with
  a common key generating section adapted to generate a common key for performing an encryption communication between the external box and the other information terminals via the communication network;
  an original information encrypting section adapted to encrypt the original information owned by any one of the plurality of information terminals based on the common key;
  a section adapted to store a public key and a private key to encrypt the common key;
  a common key encrypting section adapted to encrypt the common key with the public key;
  a common key extracting section adapted to extract the encrypted common key with the private key;
  a decryption processing section adapted to decrypt encrypted information of the original information encrypted by the one information terminal based on the extracted common key;
  an encrypted signature generating section adapted to generate an encrypted signature using the private key;
  an authorized terminal authenticating section adapted to authenticate an authorized information terminal of the plurality of information terminals that is authorized to view the original information by an information terminal that owns the encrypted original information;
  a link information generating section adapted to generate link information for linking encrypted information of the common key to the encrypted information of the original information;
  an index information generating section adapted to generate index information for disclosing the link information and the encrypted information of the original information to the one information terminal of the plurality of information terminals and the authorized information terminal, wherein the external box provides the index information to the authorized information terminal; and
a secure transport core having a program for performing an encryption communication of information transmitted/received via the communication network installed therein, and
the authorized information terminal decrypts the index information with a private key of the authorized information terminal to extract the common key, and decrypts, using the common key, the encrypted information of the original information, based on the link information.

7. An information distribution system, comprising:
a plurality of information terminals connected to a communication network, wherein an encryption communication between one information terminal of the plurality of information terminals and at least one of the other information terminals of the plurality of information terminals via the communication network is performed through a proxy server, a communication between the proxy server and the one information terminal of the plurality of information terminals is performed by an encryption communication,
the proxy server is provided with
  a common key generating section adapted to generate a common key for performing an encryption communication between the proxy server and the other information terminals via the communication network;
  an original information encrypting section adapted to encrypt original information owned by any one of the plurality of information terminals based on the common key;
  a section adapted to store a public key and a private key to encrypt the common key;
  a common key encrypting section adapted to encrypt the common key with the public key;
  a common key extracting section adapted to extract the encrypted common key with the private key;
  a decryption processing section adapted to decrypt encrypted information of the original information encrypted by the one information terminal based on the extracted common key;
  an encrypted signature generating section adapted to generate an encrypted signature using the private key;
  an authorized terminal authenticating section adapted to authenticate an authorized information terminal of the plurality of information terminals that is authorized to view the original information by an information terminal that owns the encrypted original information;
  a link information generating section adapted to generate link information for linking encrypted information of the common key to the encrypted information of the original information;
  an index information generating section adapted to generate index information for disclosing the link information and the encrypted information of the original information to the one information terminal of the plurality of information terminals and the authorized information terminal, wherein the proxy server provides the index information to the authorized information terminal; and a secure transport core having a program for performing an encryption communication of information transmitted/received via the communication network installed therein, and the authorized information terminal decrypts the index information with a private key of the authorized information terminal to extract the common key, and decrypts, using the common key, the encrypted information of the original information, based on the link information.

8. An information distribution system, comprising:

a plurality of information terminals connected to a communication network, wherein at least one information terminal of the plurality of the information terminals is provided with an information terminal of a proxy (a proxy server) to whom an authority for authorizing an information terminal to view original information is delegated from an information terminal owned by an owner of the original information, and the proxy server is provided with a common key generating section adapted to generate a common key for performing an encryption communication between the proxy server and the other information terminals of the plurality of information terminals via the communication network;

an original information encrypting section adapted to encrypt the original information owned by any one of the plurality of information terminals based on the common key;

a section adapted to store a public key to encrypt the common key, and a private key to extract the encrypted common key and to generate an encrypted signature;

a common key encrypting section adapted to encrypt the common key with the public key;

a common key extracting section adapted to extract the encrypted common key with the private key;

a decryption processing section adapted to decrypt encrypted information of the original information encrypted by one information terminal based on the extracted common key;

an encrypted signature generating section adapted to generate the encrypted signature using the private key;

an authorized terminal authenticating section adapted to authenticate an authorized information terminal of the plurality of information terminals that is authorized to view the original information by an information terminal that owns the encrypted original information;

a link information generating section adapted to generate link information for linking encrypted information of the common key to the encrypted information of the original information;

an index information generating section adapted to generate index information which is formed by the link information and the encrypted information of the original information and adapted to be disclosed to the one information terminal of the plurality of information terminals and the authorized information terminal, wherein the proxy server provides the index information to the authorized information terminal; and a secure transport core having a program for performing an encryption communication of information transmitted/received via the communication network installed therein, and the authorized information terminal decrypts the index information with a private key of the authorized information terminal to extract the common key, and decrypts, using the common key, the encrypted information of the original information, based on the link information.

9. A non-transitory computer-readable medium encoded with a computer program installed in one information terminal of a plurality of information terminals connected to a communication network to enable an information distribution between the one information terminal of the plurality of information terminals and at least one of the other information terminals of the plurality of information terminals, the at least one of the other information terminals of the plurality of information terminals including a common key generating section adapted to generate a common key for performing an encryption communication between the at least one of the other information terminals of the plurality of information terminals and another information terminal via the communication network; an original information encrypting section adapted to encrypt original information owned by any one of the plurality of information terminals based on the common key; a section adapted to store a public key and a private key to encrypt the common key; a common key encrypting section adapted to encrypt the common key with the public key; a common key extracting section adapted to extract the encrypted common key with the private key; a decryption processing section adapted to decrypt encrypted information of the original information encrypted by the at least one of the other information terminals of the plurality of information terminals based on the extracted common key; an encrypted signature generating section adapted to generate an encrypted signature using the private key; and a secure transport core having a program for achieving the encryption communication installed therein, wherein the program enables the one information terminal of the plurality of information terminals to achieve the following functions:

storing the encrypted original information in a secure storage in an encrypted state;

authenticating an authorized information terminal of the plurality of information terminals that is authorized to view the original information by an information terminal that owns the encrypted original information;

generating link information for linking encrypted information of the common key to the encrypted information of the original information;

generating index information for disclosing the link information and the encrypted information of the original information to the at least one of the other information terminals of the plurality of information terminals and the authorized information terminal; and providing the index information to the authorized information terminal, wherein the authorized information terminal decrypts the index information with a private key of the authorized information terminal to extract the common key, and decrypts, using the common key, the encrypted information of the original information, based on the link information.

* * * * *